US012579139B2

(12) United States Patent
Zhang et al.

(10) Patent No.: US 12,579,139 B2
(45) Date of Patent: Mar. 17, 2026

(54) LARGE LANGUAGE MODEL-BASED DATA QUERY OPTIMIZATION

(71) Applicant: PAYPAL, INC., San Jose, CA (US)

(72) Inventors: Anxu Zhang, Shanghai (CN); Ping Wu, Nanjing (CN); Jiake Chen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/511,261

(22) Filed: Nov. 16, 2023

(65) Prior Publication Data

US 2025/0165467 A1     May 22, 2025

(51) Int. Cl.
G06F 16/2453 (2019.01)
G06F 16/2455 (2019.01)
G06F 16/248 (2019.01)

(52) U.S. Cl.
CPC .... G06F 16/24532 (2019.01); G06F 16/2456 (2019.01); G06F 16/248 (2019.01)

(58) Field of Classification Search
None
See application file for complete search history.

(56) References Cited

U.S. PATENT DOCUMENTS

| | | | |
|---|---|---|---|
| 11,620,289 B1 * | 4/2023 | Jiang | G06F 16/24542 |
| | | | 707/718 |
| 11,947,535 B2 * | 4/2024 | Talluri | G06F 16/23 |
| 2017/0351512 A1 * | 12/2017 | Iwanir | G06F 16/24534 |
| 2020/0387508 A1 * | 12/2020 | Lucas | G06F 16/24545 |
| 2024/0020116 A1 * | 1/2024 | Chen | G06N 3/08 |
| 2024/0281222 A1 * | 8/2024 | Trummer | G06F 8/35 |

* cited by examiner

*Primary Examiner* — Dawaune A Conyers
(74) *Attorney, Agent, or Firm* — Haynes and Boone, LLP

(57) ABSTRACT

Methods and systems are presented for providing a large language model-based query optimizer to interface between program developers and database systems. The query optimizer receives programming code corresponding to a set of queries intended for a database system from a program developer. The query optimizer then uses a machine learning model to analyze the programming code and to determine a set of strategies for executing the set of data queries corresponding to the programming code. To determine the set of strategies, the machine learning model analyzes dependencies among the set of data queries and retrieves sample data from the database system. The machine learning model implement the set of strategies by incorporating additional instructions in the programming code for the database system such that the database system would execute the set of data queries according to the set of strategies.

20 Claims, 6 Drawing Sheets

400

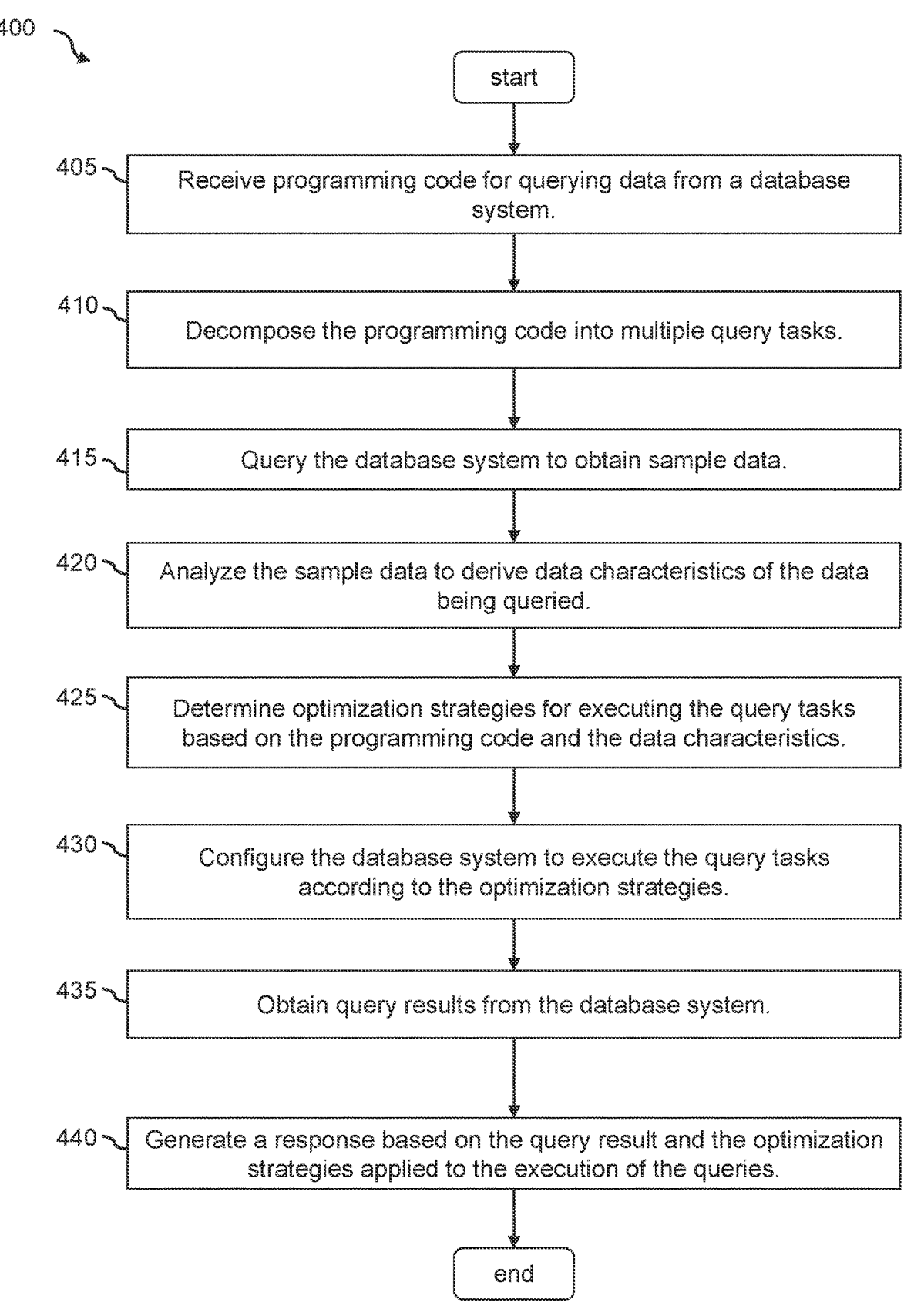

start

405 — Receive programming code for querying data from a database system.

410 — Decompose the programming code into multiple query tasks.

415 — Query the database system to obtain sample data.

420 — Analyze the sample data to derive data characteristics of the data being queried.

425 — Determine optimization strategies for executing the query tasks based on the programming code and the data characteristics.

430 — Configure the database system to execute the query tasks according to the optimization strategies.

435 — Obtain query results from the database system.

440 — Generate a response based on the query result and the optimization strategies applied to the execution of the queries.

end

Figure 4

LARGE LANGUAGE MODEL-BASED DATA QUERY OPTIMIZATION

BACKGROUND

The present specification generally relates to machine learning models, and more specifically, to providing a large language model framework for optimizing execution of data queries in a database system according to various embodiments of the disclosure.

RELATED ART

Developing and executing data queries against large-scale datasets (e.g., on a distributed database system, etc.) is a complicated and computing and time intensive task. Due to the volume of the datasets that may reside in different data structures (e.g., different tables, containers, etc.), developers are required to generate complex programming code to query these datasets. Furthermore, in order to accommodate data and/or query dependences and different portions of the datasets residing in different physical servers, developers may be required to intervene with the query execution processes by adjusting and/or fine-tuning parameters in order to optimize the efficiency in executing the queries. For example, the parameters may specify at which server some of the computation of the data from the datasets will take place, whether any data pre-processing is required to remediate data skewing in the datasets, a size of data blocks for querying and/or processing data in the datasets, etc.

Conventionally, developers typically take a trial-and-error approach and may require executing the programming code several times before identifying a set of parameters that optimizes the performance of the query execution. This becomes time-consuming and particularly burdensome for the developers and adds additional complexity to the code development process. As such, there is a need for a tool capable of automatically optimizing the parameters for executing queries against large datasets.

BRIEF DESCRIPTION OF THE FIGURES

FIG. 4 illustrates an example flow for using a large language model framework to optimize query execution according to an embodiment of the present disclosure;

Figure 1:
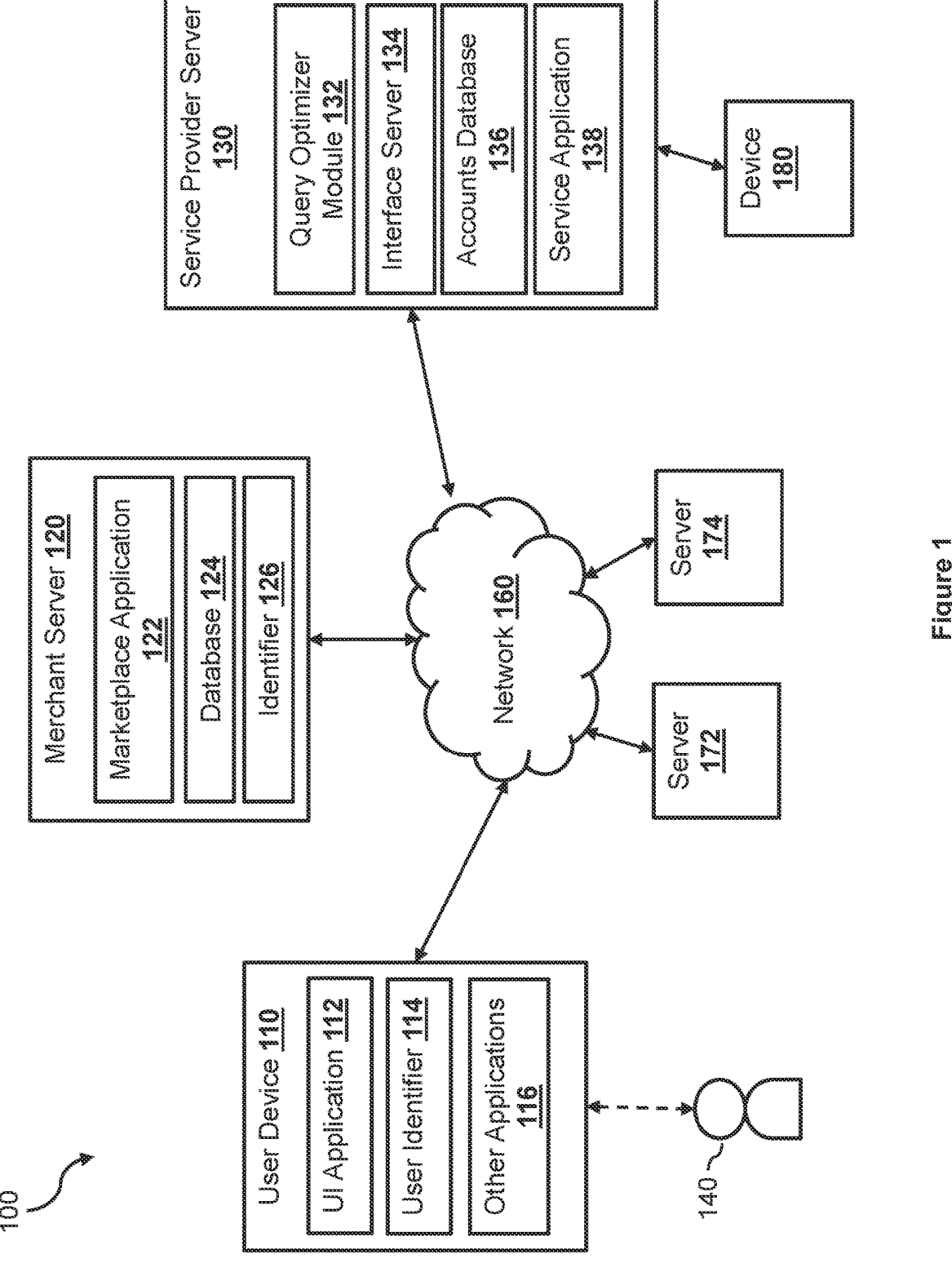
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a large language model-based data query optimizer. Unlike other types of machine learning models, large language models (also referred to as "LLM"s) are capable of accepting unstructured inputs in natural languages, understanding the semantics of natural languages, and generating outputs in natural languages. Conventionally, most of the LLMs are configured and trained to understand and generate natural languages (i.e., human languages that are used by human to communicate with each other, such as English, Italian, etc.). However, programming languages are also languages which share many similarities to natural languages. For example, programming languages also include semantics and can also be understandable by humans. As such, it has been contemplated that LLMs can be configured to accept programming code as inputs, understand the semantics of the programming code, and generate programming code as outputs.

According to various embodiments of the disclosure, a LLM-based data query optimizer provides an LLM as an interface between program developers and a database system. For example, the program developers may generate programming code for querying data against a database system (e.g., a distributed database system). As discussed herein, developing and executing data queries against large-scale datasets (e.g., data stored in a distributed database system) can be challenging. For example, a distributed database system may operate on two or more servers that are connected with each other via a computer network. The volume of the datasets that are typically stored in a large-scaled database system and the way that the data is distributed among the different servers create complexities and challenges for designing and executing the data queries. In some cases, the data may not be evenly stored across the multiple computers. As such, one or more servers may store a larger portion of the data than other servers, creating an imbalance of the workload among the multiple servers. In order to improve the efficiency in executing data queries against the large-scaled datasets, additional instructions (e.g., instructions that are in addition to the programming code for executing the data queries) are required to be provided to the database system, such that the database system would execute the data queries in a manner that improves the performance of the query execution (e.g., improving the speed of executing the data queries, improving the memory efficiency of executing the data queries, improving the computer processing efficiency of executing the data queries, etc.).

In some embodiments, the LLM-based data query optimizer may provide an interface that accepts the programming code as inputs (e.g., enabling the program developer to submit the programming code to the data query optimizer), and may configure the database system to execute the data queries associated with the programming code in a manner that improves (or optimizes) the performance of executing the data queries. For example, the programming code may be stored as a file (e.g., an SQL file, etc.) within a computer system. The file may then be provided to the data query optimizer as an input.

In some embodiments, the LLM-based data query optimizer may be an LLM or may include an LLM. The LLM may parse and analyze the programming code, in a manner similar to accepting natural languages as an input and analyzing natural languages. The LLM may determine a set of queries for execution against the database system based on analyzing the programming code. As defined by the programming code, each of the queries may include operations associated with retrieving data from one or more data structures (e.g., a table, a container, etc.) in the database system, re-organizing the data retrieved from the database system in one or more new data structures, and/or processing data from one or more data structures in the database system. For example, a query may involve retrieving a first portion of data from a first container in the database system based on a first set of criteria, retrieving a second portion of data from a second container in the database system based on a second set of criteria, processing (e.g., performing one or more mathematical operations, etc.) the first portion of data and the second portion of data, and storing the results from the processing of the first portion of data and the second portion of data in a separate data structure (e.g., another container, a table, etc.).

Based on analyzing the programming code, the LLM may also determine one or more strategies for executing the set of queries. In some embodiments, the strategies may include an execution strategy that specifies a hierarchical order. The hierarchical order may indicate a specific order for executing the set of queries, such as specifying that one or more queries in the set of queries to be executed in a sequential manner, and/or one or more queries in the set of queries to be executed in parallel.

In some embodiments, the strategies may also include optimization strategies that specify configurations to be applied when retrieving and/or processing data from the database system. For example, the optimization strategies may specify a required block size for a file retrieved from the database system to be processed, a merge condition for merging two or more files retrieved from the database system, a maximum or a minimum file size for a merged file, a specific manner in which the data should be processed (e.g., which server(s) is used to process which portion of the data, etc.), etc.

In addition, the optimization strategies may also specify additional processing to be done for a particular query when the queried data exhibits a data skew condition. A data skew condition exists when the data shows a non-uniform distribution of different types of data (e.g., fraudulent transactions vs. legitimate transactions, locations of transactions, etc.), resulting in a much larger amount of data that is of a first type than data of a second type. Heavily skewed data may cause undesirable performance in executing the queries, such as a substantial increase in the time for executing the set of queries, a delay in overall job completion times, and/or inaccurate (or undesirable) results from processing the data. Certain pre-processing of the data (e.g., selectively removing certain data, data partitioning strategies, data shuffling strategies, etc.) may remediate the negative consequences of the data skew condition. As such, when it is determined that the data to be queried using a particular data query exhibits the data skew condition, the LLM may apply an optimization strategy that involves performing one or more additional processing to the data being queried.

In some embodiments, the LLM may generate instructions associated with the strategies, and may provide the instructions to the database system in addition to the programming code. In some embodiments, the LLM may modify the programming code to incorporate and/or implement the strategies for executing the queries, and provide the modified programming code to the distributed database system. For example, the strategies may be implemented as various parameter values and/or additional instructions that are incorporated within the programming code by the LLM. Either way, based on the additional instructions generated by the LLM, the database system may execute the set of queries in a specific way according to the set of strategies. Executing the set of queries according to the additional instructions generated by the LLM provides substantial improvement to the performance (e.g., the speed performance, memory usage performance, processor usage performance) of executing the queries over simply executing the queries without applying the strategies.

In some embodiments, the LLM may perform several steps in order to determine (or generate) the strategies for executing the programming code (e.g., executing the set of queries). For example, upon receiving the programming code generated by the program developer, the LLM of some embodiments may first decompose the programming code into multiple tasks. As discussed herein, the programming code may correspond to multiple data queries, where each query may involve one or more data retrieval operations and/or one or more data processing operations. In some embodiments, the LLM may parse and analyze the programming code, and may determine the different tasks, which correspond to the different data queries, based on the programming code. By breaking up the programming code into different tasks, the LLM may analyze the tasks independently and collectively in order to generate the strategies for executing the data queries.

In some embodiments, the LLM may analyze the different data queries and metadata of the database system, and determine any dependencies of the different data queries based on the analysis. In some embodiments, the metadata of the database may represent structural information of the different data structures in the database system. For example, when the database system includes tables, the metadata may represent structural information of the different tables (e.g., a number of rows in the table, a number of columns in the table, characteristics of the columns such as the type of data being stored, the characteristics or nature of the data being stored in each column, etc.) and/or dependencies of different tables in the database system. When the database system includes file containers, the metadata may represent the number of files in each container, the minimum, average, and/or maximum size of the files in each container, the file types of the files stored in each container, etc.

Based on analyzing each data query (e.g., the data structure(s) that is being accessed based on the data query, the processing required to be performed on the data based on the data query, etc.) and the metadata of the database system, the LLM may determine any dependencies among the data queries. The LLM may then determine a hierarchical order for executing the data queries based on the data dependencies. The hierarchical order determined by the LLM may specify a specific order for executing the data queries corresponding to the programming code. For example, the LLM may determine to sequentially execute two data queries when the LLM determines that one of the data queries depends on the results of the other data query. The LLM may also determine to execute two or more data queries in parallel when the LLM determines that the two or more data queries do not depend on each other.

After determining the execution strategies (e.g., the hierarchical order) for executing the data queries collectively, the LLM of some embodiments may then select additional optimization strategies for executing each of the data queries. As discussed herein, the data from the database system may be associated with one or more characteristics. For example, the queried data may include files that exceed a threshold file size (or that are smaller than another threshold file size), the queried data may exhibit a data skew condition, the queried data may be unevenly distributed among the servers associated with the database system, one or more servers within the database system may have a higher load (or lower capacity) than other servers within the database system, etc. The LLM may apply different strategies to different individual queries based on the data characteristics of the queried data and the structural characteristics of the data storage that stores the queried data.

In some embodiments, in order to determine characteristics associated with the queried data, the LLM may generate additional queries for retrieving sample data from the database system. The additional queries may be generated based on each query in the set of queries corresponding to the programming code. For example, each of the additional queries may be generated to retrieve data from the same source(s) (e.g., the same tables, the same containers, etc.) of the database system as a corresponding data query in the set of data queries. However, the additional queries may be generated to retrieve only a sample, such as a subset (e.g., 2%, 5%, etc.) of the queried data based on the set of queries. In some embodiments, the LLM may design each additional query such that the sample data can represent the entire queried data based on the corresponding query. For example, when a query from the set of queries is configured to retrieve data from a particular data structure that satisfies a set of criteria, the LLM may generate a corresponding additional query for retrieving a subset of that data (e.g., every 10th record from the particular data structure that satisfies the set of criteria, etc.). The LLM may then execute the additional queries against the database system. Since the additional queries only retrieve a subset (and typically a substantially small portion) of the data to be retrieved based on the set of queries, the time for executing the additional queries should be relatively small. The LLM may retrieve sample data from the data structures of the database system based on the additional queries.

The LLM may then analyze the sample data retrieved using the additional queries. Since the sample data should be representative of the data to be retrieved using the set of queries, the sample data should share the same (or substantially the same) characteristics as the queried data. By analyzing the sample data, the LLM may derive the characteristics of the queried data (e.g., the servers that host the data, how is the data distributed among the servers, a minimum/maximum/average size of the files, whether a data skew condition exists, etc.). In some embodiments, the LLM may also analyze the servers that are part of the database system and that host the data to be retrieved, and determine characteristics of the servers. The LLM may then select one or more strategies for executing each of the queries based on the characteristics of the queried data and the characteristics of the computer servers that host the data. In some embodiments, the LLM may select the strategies for executing each query based on patterns that the LLM learned from training data, which may include previously processed queries that are labeled with strategies selected and applied to the queries.

For example, if the LLM determines that the queried data of a particular query exhibits a data skew condition, the LLM may select a data skew optimization strategy for executing the particular query. In some embodiments, the LLM may generate a data skew parameter based on the selection of the data skew optimization strategy. The LLM may modify the programming code to incorporate the data skew parameter (e.g., by adding code that assigns a value to a data skew attribute in the programming code, etc.). In some embodiments, the LLM may also implement, in the programming code, one or more actions to perform on the data based on the data skew optimization strategy. For example, the one or more actions may include selectively removing one or more data records that are retrieved using the particular query, causing a particular partition of the data retrieved using the particular query, shuffling the data that is retrieved using the particular query, etc. before the data is processed.

If the LLM determines that the queried data of the particular query shows an uneven distribution of the data across the different servers associated with the database system, the LLM may generate a processing parameter that specifies a particular server where the majority of the processing of the data will take place. For example, the LLM may generate the processing parameter to specify that the majority of the processing of the data to take place at a server where the majority of the data is stored in order to increase the processing efficiency and reduce data transmission across the servers.

If the LLM determines that a large portion of the queried data includes data files that are smaller than a size threshold, the LLM may generate a file merge parameter that specifies a set of criteria for merging files that are retrieved based on the particular query to improve the processing efficiency. Based on the data characteristics and the server characteristics, other optimization strategies (e.g., a hybrid query optimization strategy, an adaptive query processing strategy, star schema optimization strategy, Bayesian optimization with adaptive resolution strategy, etc.) may also be selected for optimizing the performance of executing the particular query. The LLM may generate the corresponding parameters and incorporate the parameters into the programming code. In some embodiments, instead of incorporating the parameters into the programming code, the LLM may generate additional instructions for the database system, and may provide the additional instructions along with the programming code to the database system for executing the queries.

Based on the modification to the programming code and/or the additional instructions, the database system is re-configured to execute the set of queries according to the hierarchical order and may execute each of the queries using the selected corresponding optimization strategies. For example, the database system may execute the set of queries in an order according to the hierarchical order. When executing each query, the database system may refer to the parameters in the programming code and/or the additional instructions, and may apply the optimization strategy or strategies when executing the query. By dynamically configuring the database system to execute the queries in a particular order and to apply different optimization strategies in executing each of the queries, the LLM may improve the performance of the database system in query processing without requiring additional inputs from the program developers.

After executing the set of queries, the LLM may obtain the execution results from the database system. The LLM may provide the execution results on an interface of a user device (which may be the same interface that received the programming code from the program developer). In some embodiments, the LLM may also generate a summary of the strategies applied to the set of queries, including the hierarchical order in which the queries were executed and the optimization strategies that were applied in executing each of the queries.

FIG. 1 illustrates an electronic transaction system 100, within which the LLM-based data query optimizer may be implemented according to one embodiment of the disclosure. The electronic transaction system 100 includes a service provider server 130 that is associated with the online service provider, a merchant server 120, servers 172 and 174, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., data access, account transfers or payments, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one example, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110 may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110 may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

While only one user device 110 is shown in FIG. 1, it has been contemplated that multiple user devices, that may be associated with the same or different users, may be connected to the merchant server 120 and the service provider server 130 via the network 160.

The merchant server 120 may be maintained by a business entity (or in some cases, by a partner of a business entity that processes transactions on behalf of business entity). Examples of business entities include merchants, resource information providers, utility providers, online retailers, real estate management providers, social networking platforms, a cryptocurrency brokerage platform, etc., which offer various items for purchase and process payments for the purchases. The merchant server 120 may include a merchant database 124 for identifying available items or services, which may be made available to the user device 110 for viewing and purchase by the respective users.

The merchant server 120, in one embodiment, may include a marketplace application 122, which may be configured to provide information over the network 160 to the user interface application 112 of the user device 110. The marketplace application 122 may include a web server that hosts a merchant website for the merchant. For example, the user 140 of the user device 110 may interact with the marketplace application 122 through the user interface application 112 over the network 160 to search and view various items or services available for purchase in the merchant database 124. The merchant server 120 may include at least one merchant identifier 126, which may be included as part of the one or more items or services made available for purchase so that, e.g., particular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

Each of the servers 172 and 174 may include hardware and software components for storing data associated with a database system. In some embodiments, the data stored in the servers 172 and 174 are part of a distributed database system that is configured to store data across multiple servers (e.g., including the servers 172 and 174) and to process queries for retrieving and/or processing data that is stored on the multiple servers. The database system may be hosted in the service provider server 130 and/or one or more of the servers 172 and 174, and may provide an interface for interacting with the database system (e.g., for providing programming code corresponding to a set of queries to be executed by the database system, for providing additional instructions that implement optimization strategies for executing the data queries, etc.).

The service provider server 130 may be maintained by a transaction processing entity or an online service provider, which may provide processing of electronic transactions between users (e.g., the user 140 and users of other user devices, etc.) and/or between users and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

The service application 138 may include a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, or a merchant associated with the merchant server 120, etc.) may access a user account associated with the user and access various services offered by the service provider server 130, by generating HTTP requests directed at the service provider server 130.

The service provider server 130 may be configured to maintain one or more user accounts and merchant accounts in an accounts database 136, each of which may be associated with a profile and may include account information associated with one or more individual users (e.g., the user 140 associated with user device 110, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. Account information may also include user purchase profile information such as account funding options and payment options associated with the user, payment information, receipts, and other information collected in response to completed funding and/or payment transactions. The accounts database 136 (and other databases associated with the service provider sever 130) may be configured to store data on multiple servers (e.g., the servers 172 and 174, etc.).

In one implementation, a user may have identity attributes stored with (such as accounts database 136) or accessible by the service provider server 130, and the user may have credentials to authenticate or verify identity with the service provider server 130. User attributes may include personal information, including photos, date of birth, social security number, home address, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a query optimizer module 132 that implements the LLM-based query optimizer as discussed herein. In some embodiments, the query optimizer module 132 may provide an interface on a device (e.g., device 180) that enables a user (e.g., a program developer) to submit programming code associated with a set of data queries to be executed against a database system (e.g., the accounts database 136, another database system, etc.). The interface may enable the user to submit the programming code as a file (e.g., an SQL file, etc.). Upon receiving the programming code, the query optimizer module 132 may automatically analyze the programming code, determine optimization strategies for executing the set of queries associated with the programming code, implement the optimization strategies, and instruct the database system to execute the set of queries according to the implemented optimization strategies using techniques as discussed herein.

Figure 2:
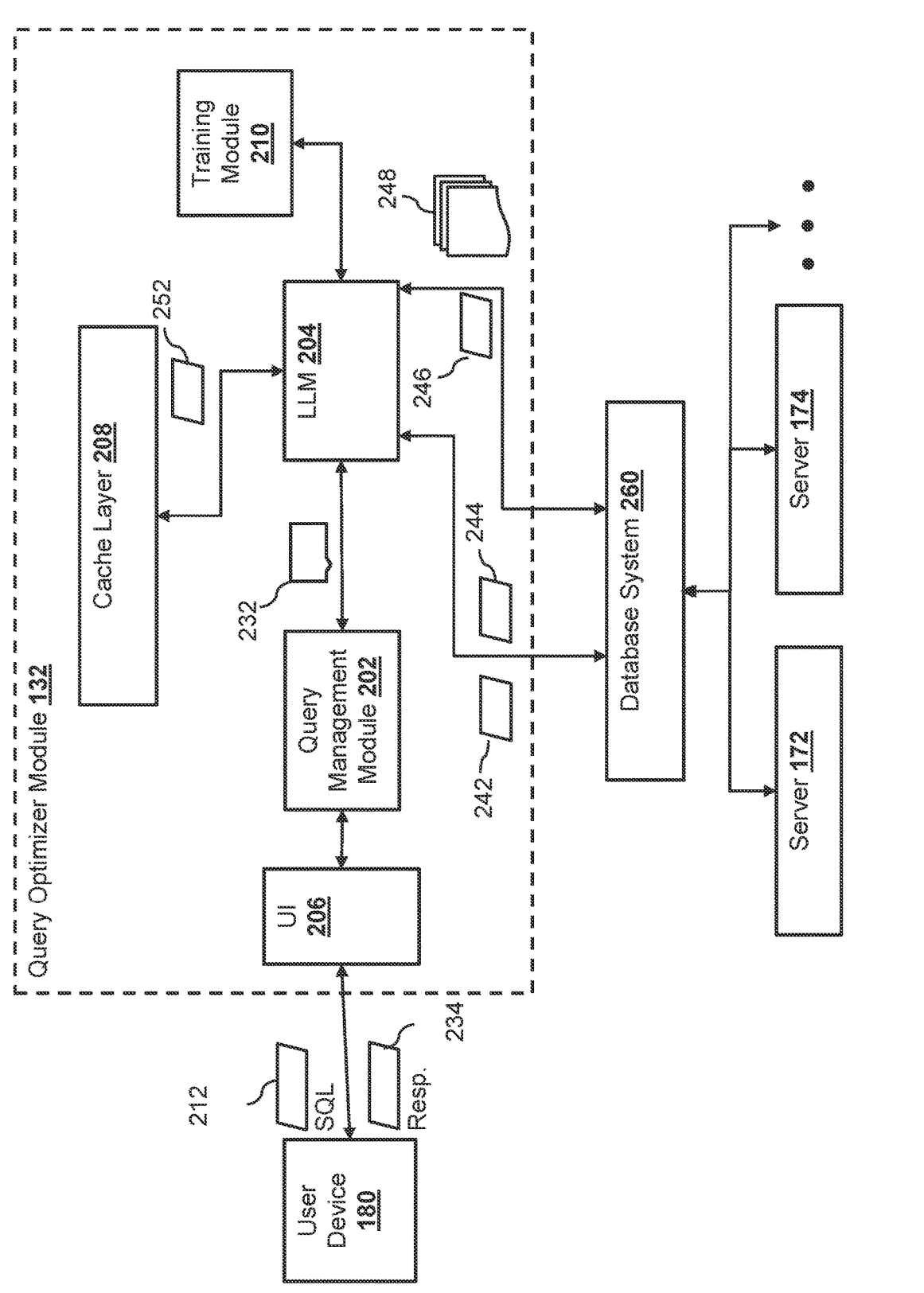
FIG. 2 is a block diagram illustrating a query optimizer module according to an embodiment of the present disclosure.

FIG. 2 is a block diagram illustrating the query optimizer module 132 according to various embodiments of the disclosure. In some embodiments, the query optimizer module 132 may use a large language model (also referred to as "LLM") (such as LLM 204) as an interface between program developers and database systems. The query optimizer module 132 may include a user interface module 206 configured to provide an interface on a device (e.g., the device 180), which enables a user (e.g., a program developer) to submit programming code 232 associated with a set of data queries to be executed against a database system 260 (or other database systems). In this example as shown in FIG. 2, the database system 260 is a distributed database system (e.g., a NoSQL database system, a distributed SQL database system, Apache Hadoop®, Apache Cassandra®, etc.) that is configured to store a large amount of data within multiple servers, such as servers 172 and 174, and possibly other computer servers. As discussed herein, the volume of datasets that are typically stored in a large-scaled database system (such as the database system 260) and the way that the data is distributed among the different servers (such as the servers 172, 174, and other computer servers) creates complexities and challenges for designing and executing data queries. In some cases, the data may not be evenly stored across the servers 172 and 174. As such, one or more servers may store a larger portion of the data than other servers, creating an imbalance of the workload among the multiple servers. In order to improve the efficiency in executing data queries against the large-scaled datasets, additional instructions (e.g., instructions that are in addition to the programming code 232 for executing the data queries) are required to be provided to the database system 260, such that the database system 260 executes the data queries in a manner that improves the performance of the query execution (e.g., improving the speed of executing the data queries, improving the memory efficiency of executing the data queries, improving the computer processing efficiency of executing the data queries, etc.). Although the database system 260 is described as a large-scale distributed database system for illustration purposes, the query optimization techniques described herein are applicable for optimizing query executions for other types of database system as well.

In some embodiments, the programming code 232 may be stored as a computer file 212 (e.g., an SQL file), which can be transmitted to the query optimizer module 132 from the user device 180 via the user interface provided by the user interface module 206. Instead of executing the computer file 212 at the database system 260, the query optimizer module 132 may use the LLM 204 to provide additional instructions corresponding to strategies for optimizing the performance of executing the queries corresponding to the programming code 232. As such, upon receiving the computer file 212 via the user interface module 206, a query management module 202 may extract the programming code 232 from the file 212, and may provide the programming code 232 to the LLM 204. The LLM 204 is a large language module (e.g., ChatGPT by OpenAIR, BERT, ROBERTa, etc.) that is capable of accepting unstructured inputs such as sentences in a natural language, understanding and analyzing the semantics of the natural language inputs, and providing an output in a natural language. In some embodiments, the LLM 204 may be configured and trained (e.g., by a training module 210) to accept programming codes in one or more particular programming languages as input, understand and analyze the semantics of the programming codes, and generate programming codes as output.

For example, the LLM 204 may decompose the programming code 232 into a set of data queries. By analyzing the portion of the programming code 232 corresponding to each data query, the LLM 204 may determine the operation(s) associated with each of the queries. The LLM 204 may determine that the set of data queries includes a first query associated with updating data included in a first data structure of the database system 260. The LLM 204 may also determine that the set of data queries includes a second query associated with retrieving a portion of data from the first data structure that satisfies a first set of criteria, retrieving a portion of data from a second data structure that satisfies a second set of criteria, combining the portion of the data from the first data structure and the portion of the data from the second data structure, and generating a new data structure to store the combined data. The LLM 204 may also determine that the set of data queries includes a third query associated with accessing data in a third data structure that satisfies a third set of criteria, performing calculations using the data from the third data structure, and storing the processed data in a fourth data structure. The LLM 204 may determine operations of any other additional queries in the set of data queries.

By dividing the programming code 232 into the different data queries executable against the database system 260, the LLM 204 may analyze each of the queries individually and also the set of queries collectively in order to determine optimization strategies for executing the set of queries. In some embodiments, the LLM 204 may analyze the data queries and metadata 252 associated with the database system 260 to determine an execution strategy for executing the set of data queries. The metadata 252 associated with the database system 260 may represent structural information of the different data structures in the database system 260. For example, when the database system 260 includes tables, the metadata 252 may represent structural information of the different tables (e.g., a number of rows in the table, a number of columns in the table, characteristics of the columns such as the type of data being stored, the characteristics or nature of the data being stored in each column, etc.) and/or dependencies of different tables (e.g., how data in one data structure may affect data in another data structure, etc.) in the database system 260. When the database system 260 includes file containers, the metadata 252 may represent the number of files in each container, the minimum, average, and/or maximum size of the files in each container, the file types of the files stored in each container, etc. In some embodiments, the LLM 204 may access the database system 260, analyze the data structures associated with the database system 260, and generate the metadata 252. In some embodiments, the LLM 204 may obtain the metadata 252 from the database system 260. After obtaining the metadata 252, the LLM 204 may store the metadata 252 in a cache layer 208 such that the metadata 252 can be accessed more efficiently when processing subsequent queries against the database system 260.

In some embodiments, the execution strategy determined by the LLM 204 may include a hierarchical order in which the set of data queries are executed. The hierarchical order may specify which query should be executed before which other query, and/or which subset of queries can be executed in parallel. For example, the LLM 204 may determine any dependencies among the queries in the set of queries. The LLM 204 may then determine that two queries should be executed sequentially (e.g., executing a first query before executing a second query) when the second query depends on the outcome from the first query, and may determine that two queries should be executed in parallel when neither of the two queries depends on the other query. For example, since the second query in the set of query requires data from the first data structure, which may be updated based on the first query, the LLM 204 may determine a hierarchical order that specifies to execute the second query after the first query is executed. On the other hand, the LLM 204 may determine that, since the third query is not dependent on any other queries in the set of queries, the third query can be executed in parallel with the execution of the first query. As such, the LLM 204 may generate a hierarchical order that specifies a parallel execution of the first query and the first query, and a sequential execution of the first query and the second query.

In some embodiments, the LLM 204 may incorporate the execution strategy into the programming code 232. For example, the LLM 204 may modify the programming code 232 by changing an order of different portions of the programming code 232 that correspond to the different queries. In some embodiments, the LLM 204 may also insert additional code into the programming code 232 that instructs the database system 260 to execute certain queries in a particular order (e.g., in parallel or in sequence, etc.).

In some embodiments, the LLM 204 may further analyze each of the set of queries individually to determine optimization strategies for executing each of the queries. As discussed herein, the data from the database system 260 may be associated with one or more characteristics. For example, the queried data (the data being queried using the set of queries) may include files that exceed a threshold file size (or that are smaller than another threshold file size), the queried data may exhibit a data skew condition, the queried data may be unevenly distributed among the servers 172 and 174 associated with the database system 260, one or more of the servers 172 and 174 within the database system 260 may have a higher load (or lower capacity) than other servers within the database system 260, etc. The LLM 240 may apply different strategies to different individual queries based on the data characteristics of the queried data and the structural characteristics of the data storages that store the queried data.

In some embodiments, in order to determine characteristics associated with the queried data, the LLM 204 may generate additional queries 242 for retrieving sample data 244 from the database system 260. The queries 242 may be generated based on each query in the set of queries corresponding to the programming code 232. For example, the additional queries 242 may be generated to retrieve data from the same source(s) (e.g., the same tables, the same containers, etc.) of the database system 260 as the set of data queries corresponding to the programming code 232. However, the additional queries 252 may be generated to retrieve only a sample, such as a subset (e.g., 2%, 5%, etc.) of the queried data based on the set of queries. In some embodiments, the LLM 204 may design and/or construct the queries 252 to retrieve the sample data 244 such that the sample data 244 can represent the entire queried data based on the corresponding query. For example, when a query from the set of queries is configured to retrieve data from a particular data structure that satisfies a set of criteria, the LLM 204 may generate a corresponding additional query for retrieving a subset of that data (e.g., every 10th record from the particular data structure that satisfies the set of criteria, etc.). The LLM 204 may then execute the additional queries 242 against the database system 260 to obtain the sample data 244. Since the additional queries 242 only retrieve a subset (and typically a substantially small portion) of the data to be retrieved based on the set of queries, the time for executing the additional queries 242 should be relatively small (e.g., without significantly affecting the performance of executing the set of queries).

The LLM 204 may then analyze the sample data 244 to determine the characteristics of the queried data. Since the sample data 244 should be representative of the data to be retrieved using the set of queries, the sample data 244 should share the same (or substantially the same) characteristics as the queried data. By analyzing the sample data 244, the LLM 204 may derive the characteristics of the queried data (e.g., the servers that host the data, how is the data distributed among the servers 172 and 174, a minimum/maximum/average size of the files being queried, whether a data skew condition exists in the queried data, etc.). In some embodiments, the LLM 204 may also analyze the servers that are part of the database system and that host the data to be retrieved, and determine characteristics of the servers 172 and 174 (e.g., a processing load of each of the servers 172 and 174, a processing capacity of each of the servers 172 and

174, etc.). Based on the characteristics of the queried data and the characteristics of the computer servers 172 and 174, the LLM 204 may select one or more optimization strategies for executing each of the queries.

For example, if the LLM 204 determines that the queried data associated with a particular query (e.g., the third query, etc.) exhibits a data skew condition, the LLM may select a data skew optimization strategy for executing the particular query. In some embodiments, the LLM 204 may generate a data skew parameter based on the selection of the data skew optimization strategy. The data skew parameter may indicate, to the database system 260, specific steps to take when processing the particular query, which will alleviate the negative effects of the data skew condition. In some embodiments, the LLM 204 may modify the programming code 232 to incorporate the data skew parameter (e.g., by adding code that assigns a value to a data skew attribute in the programming code 232, etc.). In some embodiments, the LLM 204 may also implement, in the programming code 232, one or more actions to perform on the data based on the data skew optimization strategy. The one or more actions may include selectively removing one or more data records that are retrieved using the particular query, causing a particular partition of the data retrieved using the particular query, shuffling the data that is retrieved using the particular query, etc. before the data is processed. The LLM 204 may implement the one or more actions by inserting additional code into the programming code 232.

In another example, if the LLM 204 determines that the queried data of the particular query shows an uneven distribution (e.g., exceeding a threshold deviation) of the data across the different servers 172 and 173 associated with the database system 260, the LLM may generate a processing parameter that specifies a particular server (e.g., the server 172) for performing the majority of the processing of the data in order to improve the efficiency of executing the set of queries. For example, the LLM 204 may determine to use the server 172 instead of the server 173 to perform the majority of the data processing since the majority of the data is stored on the server 172, the server 172 has a larger processing capacity, the server 172 has a lower processing load, or other factors.

In yet another example, if the LLM 204 determines that a large portion of the queried data includes data files that are smaller than a size threshold, the LLM 204 may generate a file merge parameter that specifies a set of criteria for merging files that are retrieved based on the particular query to improve the processing efficiency. Based on the data characteristics and the server characteristics, other optimization strategies (e.g., a hybrid query optimization strategy, an adaptive query processing strategy, star schema optimization strategy, Bayesian optimization with adaptive resolution strategy, etc.) may also be selected for optimizing the performance of executing the particular query. The LLM 204 may generate the corresponding parameters and incorporate the parameters into the programming code 232. For example, the LLM 204 may assign values to different parameter attributes in the programming code 232. In some embodiments, instead of or in addition to assigning values to different attributes, the LLM 204 may also insert additional codes for performing additional steps associated with the selected optimization strategies, such that the database system 260 may execute the additional steps in preparation for the execution of the particular query. In some embodiments, instead of incorporating the parameters or additional codes into the programming code 232, the LLM 204 may generate separate instructions for the database system 262 (e.g., separate from the programming code 232), and may provide the additional instructions along with the programming code 232 as input data 246 to the database system 260 for executing the queries.

The parameters/the additional code added to the programming code 232, the modification to the programming code 232, and/or the additional instructions, when provided to the database system 260, re-configure the database system 260 such that the database system 260 would execute the set of queries corresponding to the programming code 232 in a particular manner and using the selected optimization strategies. Specifically, based on the modification to the programming code 232 and/or the additional instructions, the database system 260 may execute the series of queries corresponding to the programming code 232 according to the hierarchical order determined by the LLM 204. The database system 260 may also perform additional steps according to the various optimization strategies for executing each of the queries to further enhance the efficiency of executing the set of queries. Based on executing the set of queries, the database system 260 may provide to the LLM 204 results 248. The results 248 may include data being retrieved from the servers 172 and 174 by the database system 260 and/or processed by the database system 260.

In some embodiments, the LLM 204 may generate a response 234 to the user of the user device 180 based on the results 248 obtained from executing the set of queries. For example, the LLM 204 may include the results 248 and the optimization strategies that have been applied to the execution of the queries in the response 234. The response 234 may be presented on the user device 180 via the interface provided by the user interface module 206.

In some embodiments, the training module 210 may use training data to train the LLM 204 such that the LLM 204 may learn patterns associated with previously processed queries to determine the correct optimization strategies for executing different sets of queries based on the data characteristics and server characteristics. The training data may include various sets of programming code processed by the database system 260 (and possibly other database systems) in the past. The training data may also be labeled with (a) additional queries used to retrieve sample data and (b) strategies that have been applied to the corresponding set of programming code. The additional queries and the strategies may have been generated by one or more program developers in the past (e.g., using a trial-and-error method, etc.). Based on recognizing the patterns derived from the training data and the labels, the LLM 204 may be trained to generate the proper additional queries for retrieving sample data, determining data characteristics based on the sample data, and determine optimization strategies for executing a set of queries based on the data characteristics and server characteristics of the servers.

Figure 3:
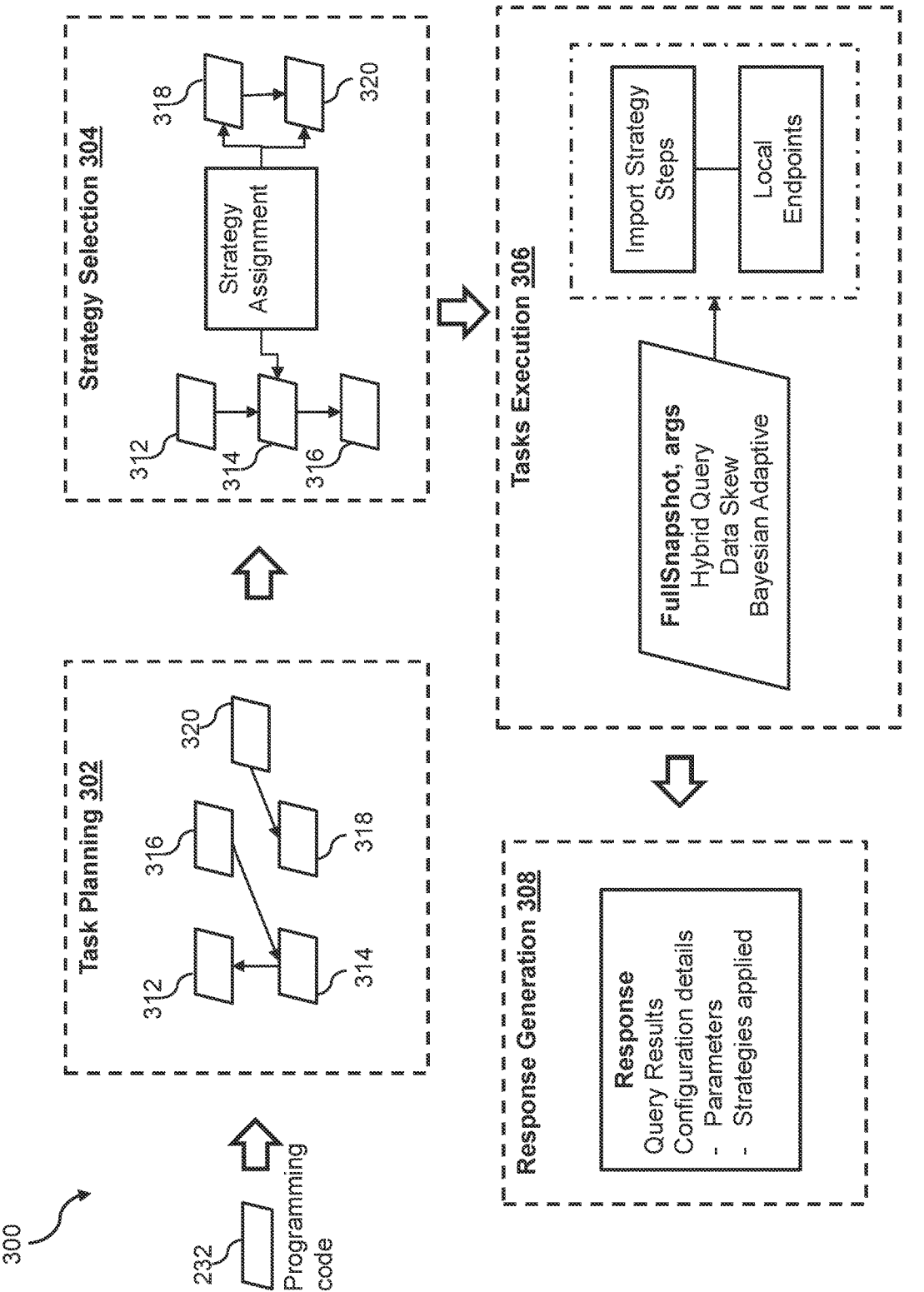
FIG. 3 is a block diagram illustrating various actions performed by a machine learning model for optimizing the execution of a set of data queries according to an embodiment of the present disclosure.

FIG. 3 illustrates a series of actions 300 performed by the LLM 204 in processing programming code 232 according to various embodiments of the disclosure. As shown, the series of actions 300 includes a task planning action 302, a strategy selection action 304, a tasks execution action 306, and a response generation action 308. Upon receiving the programming code 232, the LLM 204 may perform the task planning action 302. The task planning action 302 may include decomposing the programming code 232 into a set of data queries, such as data queries 312, 314, 316, 318, and 320. The task planning action 302 may also include analyzing the various data queries 312, 314, 316, 318, and 320 to determine a hierarchical order for executing the set of queries. For example, the LLM 204 may determine that the data query 314 depends on the output of the data query 312, that the data query 316 depends on the output of the data query 314, and that the data query 320 depends on the output of the data query 318. The LLM 204 may then determine the hierarchical order that specifies sequentially executing the data queries 312, 314, and 316 and sequentially executing the data queries 318 and 320. In order to improve the efficiency of executing the set of queries, the hierarchical order may also specify a parallel execution between the two sequences of data queries.

After performing the task planning action 302, the LLM 204 may perform the strategy selection 304, which includes assigning different optimization strategies to different queries for execution. For example, the LLM 204 may generate additional queries (e.g., queries 242) to retrieve sample data from the database system 260. The sample data may represent a portion of the queried data to be retrieved based on the set of queries 312, 314, 316, 318, and 320. By analyzing the characteristics of the sample data and the characteristics of the servers (e.g., the servers 172 and 174, etc.) that store the sample data, the LLM 204 may determine optimization strategies for executing each of the data queries 312, 314, 316, 318, and 320. Each optimization strategy, when applied to the execution of a corresponding data query, may enhance the performance (e.g., the speed, the processing efficiency, the memory usage efficiency, etc.) of executing the corresponding data query. In some embodiments, an optimization strategy may involve at least one of performing additional actions to the queried data (selectively removing some of the queried data, merging at least a portion of the queried data based on a file size, etc.), assigning one or more servers for processing the queried data, or other actions.

The LLM 204 then performs the tasks execution action 306. For example, the LLM 204 may implement the selected optimization strategies into the programming code 232 or additional instructions, and may provide the modified programming code 232 and/or the additional instructions to the database system 260. As such, the execution of each of the set of queries 312, 314, 316, 318, and 320 will come with additional parameters and/or additional instructions. In some embodiments where the optimization strategies are implemented as various parameters incorporated into the programming code 232, the database system 260 may import the steps corresponding to the optimization strategies specified by the parameters, and execute the steps along with the corresponding data query. After executing the set of queries 312, 314, 316, 318, and 320 according to the execution strategies and optimization strategies specified by the LLM 204, the database system 260 may provide query results 248 to the LLM 204.

The LLM 204 may perform the response generation action 308 based on the query results 248. The query results 248 may include data that has been retrieved from the database system 260 based on the set of queries 312, 314, 316, 318, and 320, and information that has been generated by processing the data that has been retrieved from the database system 260. For example, the LLM 204 may generate the response 234 to include the query results and the configuration details associated with executing the set of queries 312, 314, 316, 318, and 320, such as the parameters included, the strategies applied, the execution order for the set of queries 312, 314, 316, 318, and 320, etc. The LLM 204 may then present the response 234 via a user interface generated by the user interface module 206.

FIG. 4 illustrates a process 400 for performing query optimization using a large language model according to various embodiments of the disclosure. In some embodiments, at least a portion of the process 400 may be performed by the query optimizer module 132. The process 400 begins by receiving (at step 405) programming code for querying data from a database system. For example, the query optimizer module 132 may receive the file 212 that contains the programming code 232 from the user device 180 via the user interface provided by the user interface module 206. The query management module 202 may extract the programming code 232 from the file 212, and may provide the programming code 232 to the LLM 204. The process 400 then decomposes (at step 410) the programming code into multiple query tasks. For example, the LLM 204 may parse the programming code 232 and may divide the programming code 232 into multiple sections, each section corresponding to a different data query task.

The process 400 queries (at step 415) the database system to obtain sample data, analyzes (at step 420) the sample data to derive data characteristics of the data being queried, and determines (at step 425) optimization strategies for executing the query tasks based on the programming code and the data characteristics. For example, the LLM 204 may generate additional queries 242 based on the set of queries 312, 314, 316, 318, and 320 to retrieve sample data from the database system 260. The sample data may represent a portion of the queried data associated with the set of queries 312, 314, 316, 318, and 320. In some embodiments, the LLM 204 may analyze the sample data to derive data characteristics associated with the queried data. The LLM 204 may then select optimization strategies for each of the queries 312, 314, 316, 318, and 320 for execution. In some embodiments, the LLM 204 may incorporate the programming code and the optimization strategies together into an instruction set 246 to provide to the database system 260.

As such, the process 400 configures (at step 430) the database system to execute the query tasks according to the optimization strategies and obtains (at step 435) query results from the database system. For example, by providing the instruction set 246 to the database system 260, the database system 260 is configured to execute the set of data queries 312, 314, 316, 318, and 320 according to the optimization strategies selected by the LLM 204. The LLM 204 may obtain the query results 248 from the database system 260.

The process 400 then generates (at step 440) a response based on the query results and the optimization strategies applied to the execution of the queries. For example, the LLM 204 may generate the response 234 to include the query results 248 and information representing the execution strategies (e.g., the hierarchical order in which the queries were executed) and the optimization strategies that were applied to each of the queries when the queries were executed. The LLM 204 or the query management module 202 may then present the response 234 on the user device 180.

Figure 5:
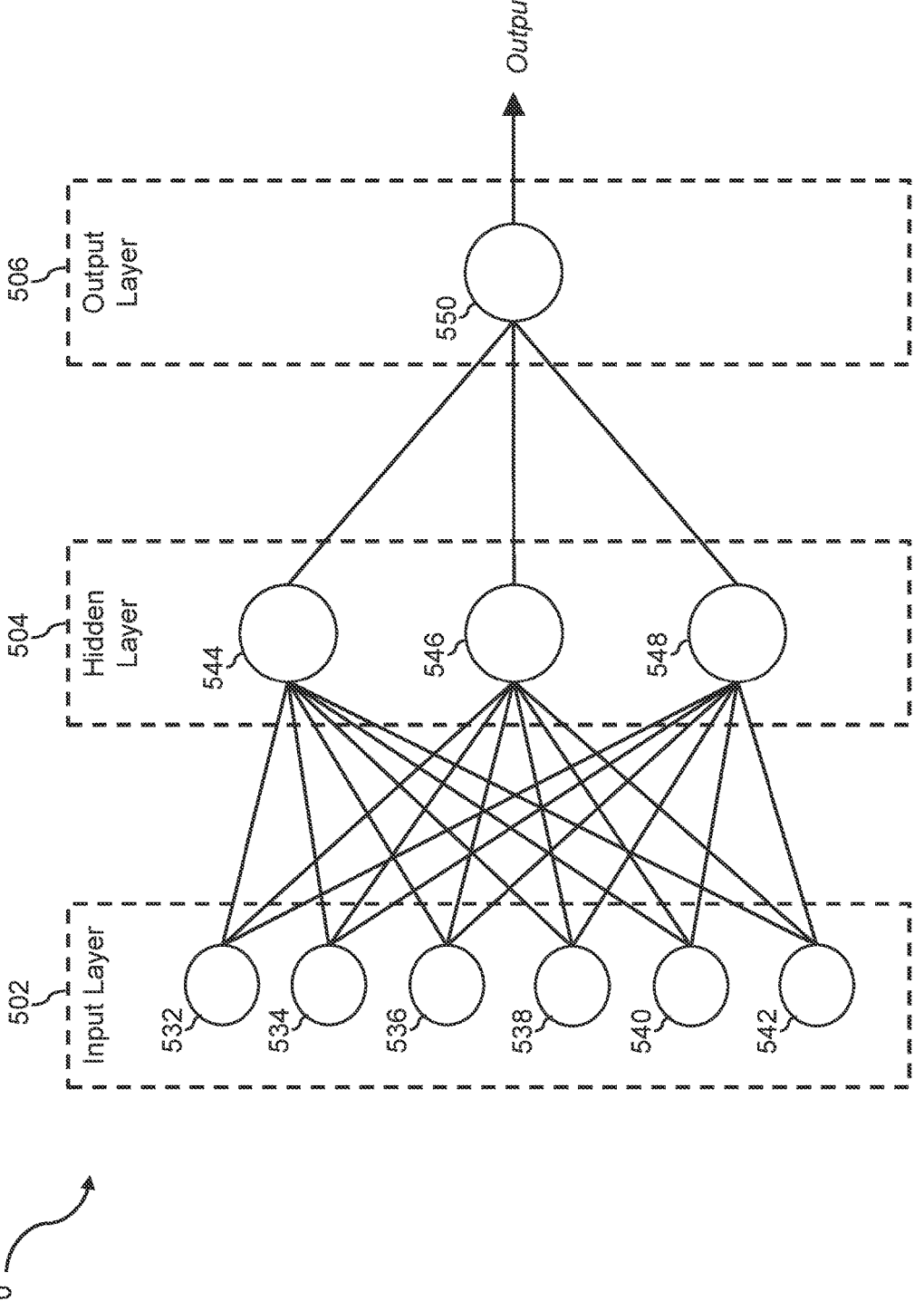
FIG. 5 illustrates an example neural network that can be used to implement a machine learning model according to an embodiment of the present disclosure.

FIG. 5 illustrates an example artificial neural network 500 that may be used to implement a machine learning model, such as the LLM 204. As shown, the artificial neural network 500 includes three layers—an input layer 502, a hidden layer 504, and an output layer 506. Each of the layers 502, 504, and 506 may include one or more nodes (also referred to as "neurons"). For example, the input layer 502 includes nodes 532, 534, 536, 538, 540, and 542, the hidden layer 504 includes nodes 544, 546, and 548, and the output layer 506 includes a node 550. In this example, each node in a layer is connected to every node in an adjacent layer via edges and an adjustable weight is often associated with each edge. For example, the node 532 in the input layer 502 is connected to all of the nodes 544, 546, and 548 in the hidden layer 504. Similarly, the node 544 in the hidden layer is connected to all of the nodes 532, 534, 536, 538, 540, and 542 in the input layer 502 and the node 550 in the output layer 506. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 504 is an intermediate layer between the input layer 502 and the output layer 506 of the artificial neural network 500. Although only one hidden layer is shown for the artificial neural network 500 for illustrative purpose only, it has been contemplated that the artificial neural network 500 used to implement any one of the computer-based models may include as many hidden layers as necessary. The hidden layer 504 is configured to extract and transform the input data received from the input layer 502 through a series of weighted computations and activation functions.

In this example, the artificial neural network 500 receives a set of inputs and produces an output. Each node in the input layer 502 may correspond to a distinct input. For example, when the artificial neural network 500 is used to implement the LLM 204, the nodes in the input layer 502 may correspond to the content of a programming code in a programming language (e.g., the programming code 232, etc.).

In some embodiments, each of the nodes 544, 546, and 548 in the hidden layer 504 generates a representation, which may include a mathematical computation (or algorithm) that produces a value based on the input values received from the nodes 532, 534, 536, 538, 540, and 542. The mathematical computation may include assigning different weights (e.g., node weights, edge weights, etc.) to each of the data values received from the nodes 532, 534, 536, 538, 540, and 542, performing a weighted sum of the inputs according to the weights assigned to each connection (e.g., each edge), and then applying an activation function associated with the respective node (or neuron) to the result. The nodes 544, 546, and 548 may include different algorithms (e.g., different activation functions) and/or different weights assigned to the data variables from the nodes 532, 534, 536, 538, 540, and 542 such that each of the nodes 544, 546, and 548 may produce a different value based on the same input values received from the nodes 532, 534, 536, 538, 540, and 542. The activation function may be the same or different across different layers. Example activation functions include but not limited to Sigmoid, hyperbolic tangent, Rectified Linear Unit (ReLU), Leaky ReLU, Softmax, and/ or the like. In this way, after a number of hidden layers, input data received at the input layer 502 is transformed into rather different values indicative data characteristics corresponding to a task that the artificial neural network 500 has been designed to perform.

In some embodiments, the weights that are initially assigned to the input values for each of the nodes 544, 546, and 548 may be randomly generated (e.g., using a computer randomizer). The values generated by the nodes 544, 546, and 548 may be used by the node 550 in the output layer 506 to produce an output value (e.g., a response to a user query, a prediction, etc.) for the artificial neural network 500. The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class. When the artificial neural network 500 is used to implement the LLM 204, the output node 550 may be configured to generate programming code (e.g., the additional queries 242 associated with querying sample data from the database system 260, the set of instructions 246 for the database system 260 that may include a modified version of the programming code 232 and/or additional instructions, the response 234, etc.

In some embodiments, the artificial neural network 500 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance.

The artificial neural network 500 may be trained by using training data based on one or more loss functions and one or more hyperparameters. By using the training data to iteratively train the artificial neural network 500 through a feedback mechanism (e.g., comparing an output from the artificial neural network 500 against an expected output, which is also known as the "ground-truth" or "label"), the parameters (e.g., the weights, bias parameters, coefficients in the activation functions, etc.) of the artificial neural network 500 may be adjusted to achieve an objective according to the one or more loss functions and based on the one or more hyperparameters such that an optimal output is produced in the output layer 506 to minimize the loss in the loss functions. Given the loss, the negative gradient of the loss function is computed with respect to each weight of each layer individually. Such negative gradient is computed one layer at a time, iteratively backward from the last layer (e.g., the output layer 506 to the input layer 502 of the artificial neural network 500). These gradients quantify the sensitivity of the network's output to changes in the parameters. The chain rule of calculus is applied to efficiently calculate these gradients by propagating the gradients backward from the output layer 506 to the input layer 502.

Parameters of the artificial neural network 500 are updated backwardly from the last layer to the input layer (backpropagating) based on the computed negative gradient using an optimization algorithm to minimize the loss. The backpropagation from the last layer (e.g., the output layer 506) to the input layer 502 may be conducted for a number of training samples in a number of iterative training epochs. In this way, parameters of the artificial neural network 500 may be gradually updated in a direction to result in a lesser or minimized loss, indicating the artificial neural network 500 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to determine optimization strategies for a set of queries.

Figure 6:
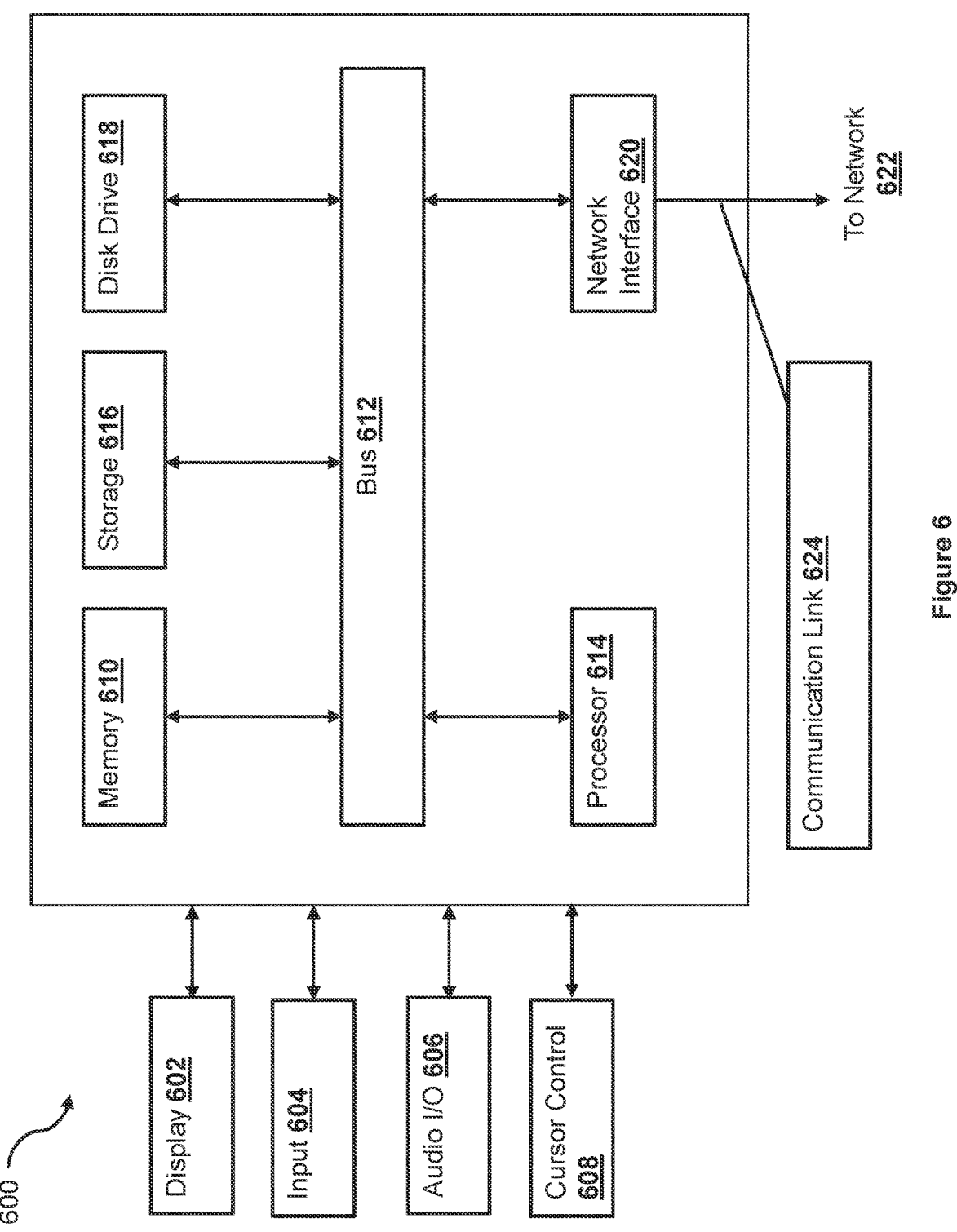
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, the servers 172 and 174, the user device 110, and the device 180. In various implementations, each of the user devices 110 and the device 180 may include a mobile cellular phone, personal computer (PC), laptop, wearable computing device, etc. adapted for wireless communication, and each of the service provider server 130, the merchant server 120, and the servers 172 and 174 may include a network computing device, such as a server. Thus, it should be appreciated that the devices 110, 120, 130, 172, 174, and 180 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via a network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the query optimization functionalities described herein, for example, according to the process 400.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving, by a machine learning model, first programming code for execution against a database system;

determining, by the machine learning model, a first portion of the first programming code for retrieving a set of data from the database system and a second portion of the first programming code for processing the set of data;

generating, by the machine learning model, second programming code based on the first portion of the first programming code, wherein the second programming code is generated for retrieving a subset of the set of data from the database system;

obtaining, by the machine learning model, the subset of the set of data from the database system based on executing the second programming code against the database system;

determining, by the machine learning model, a particular data distribution pattern associated with a manner in which the set of data is stored across a plurality of data servers associated with the database system based on analyzing data characteristics associated with the subset of the set of data obtained from the database system;

rearranging, by the machine learning model and based on the particular data distribution pattern, the set of data in the database system prior to executing the first programming code;

determining, by the machine learning model, a set of strategies for executing the first programming code for querying the database system based on the data characteristics associated with the subset of the set of data;

modifying, by the machine learning model, the first programming code according to the set of strategies;

executing, by the machine learning model, the modified first programming code for querying and processing the set of data from the database system; and generating, by the machine learning model, a query result based on the processed set of data.

2. The system of claim 1, wherein the subset of the set of data corresponds to a percentage of the set of data below a threshold percentage.

3. The system of claim 1, wherein the operations further comprise:

decomposing the first programming code into a plurality of query tasks based on analyzing the first programming code, wherein the determining the first portion and the second portion of the first programming code is based on the plurality of query tasks.

4. The system of claim 1, wherein the operations further comprise:

incorporating a set of parameters into the first programming code based on the data characteristics associated with the subset of the set of data, wherein the set of parameters comprises at least one of a block size parameter specifying a block size of a file or a data skew parameter indicating whether a data skew condition exists in the data being queried.

5. The system of claim 1, wherein the set of strategies comprises an execution strategy that specifies at least one of a parallel execution of two or more query tasks associated with the first programming code or a sequential execution of the two or more query tasks.

6. The system of claim 1, wherein the set of strategies comprises an execution strategy that specifies an order for executing a plurality of query tasks associated with the first programming code.

7. The system of claim 1, wherein the machine learning model is configured to determine one or more dependencies among a plurality of query tasks associated with the first programming code, and wherein the set of strategies is determined based on the one or more dependencies.

8. A method comprising:

receiving, by a machine learning model of a computer system, first programming code intended for a database system;

determining, by the machine learning model, that a first portion of the first programming code is associated with retrieving a set of data from the database system and a second portion of the first programming code is associated with processing the set of data;

generating, by the machine learning model, second programming code based on the first portion of the first programming code, wherein the second programming code is generated for retrieving a subset of the set of data from the database system;

obtaining, by the machine learning model, the subset of the set of data from the database system based on executing the second programming code against the database system;

determining, by the machine learning model, a particular data distribution pattern associated with how the set of data is stored across a plurality of data servers associated with the database system based on analyzing data characteristics associated with the subset of the set of data obtained from the database system;

rearranging, by the machine learning model, the set of data in the database system prior to executing the first programming code based on the particular data distribution pattern;

modifying, by the machine learning model, the first programming code based on the data characteristics, wherein the modifying comprises incorporating a set of strategies into the first programming code;

executing, by the machine learning model, the modified first programming code for querying and processing the set of data from the database system; and generating, by the machine learning model, a query result based on the processed set of data.

9. The method of claim 8, wherein the first programming code is associated with a plurality of query tasks comprising at least one of a table creation task for creating a table based on the set of data queried from the distributed database system, a join task for joining a plurality of tables created based on the set of data, or an operation task for performing one or more operations on the set of data.

10. The method of claim 8, further comprising:

decomposing the first programming code into a plurality of query tasks based on analyzing the first programming code.

11. The method of claim 8, further comprising:

generating a response representing the set of strategies used to query the set of data from the database system.

12. The method of claim 11, further comprising:

providing the response to a device.

13. The method of claim 8, further comprising:

determining the data characteristics associated with the subset of the set of data based on analyzing the subset of the set of data.

14. The method of claim 8, further comprising:

generating, by the machine learning model, a plurality of parameters for implementing the set of strategies; and incorporating, by the machine learning model, the plurality of parameters into the first programming code.

15. A non-transitory machine-readable medium having stored thereon machine-readable instructions executable to cause a machine to perform operations comprising:

determining, by a machine learning model executed on the machine and based on analyzing first programming code received from a user device, that a portion of the first programming code corresponds to retrieving a set of data from a database system;

generating, by the machine learning model, second programming code based on the portion of the first programming code, wherein the second programming code is generated for retrieving a subset of the set of data from the database system;

obtaining, by the machine learning model, the subset of the set of data from the database system based on executing the second programming code;

determining, by the machine learning model, a particular data distribution pattern associated with how the set of data is stored across a plurality of data servers associated with the database system based on analyzing data characteristics associated with the subset of the set of data obtained from the database system;

rearranging, by the machine learning model, the set of data in the database system prior to executing the first programming code based on the particular data distribution pattern;

determining, by the machine learning model, a set of strategies for executing the first programming code based on the data characteristics;

implementing, by the machine learning model, the set of strategies, wherein the implementing comprises modifying the first programming code to include additional instructions corresponding to the set of strategies;

executing, by the machine learning model, the modified first programming code against the database system; and generating, by the machine learning model, a query result based on the set of data obtained from the database system.

16. The non-transitory machine-readable medium of claim 15, wherein the operations further comprise:

determining the data characteristics associated with the subset of the set of data based on analyzing the subset of the set of data.

17. The non-transitory machine-readable medium of claim 15, wherein the operations further comprise:

generating a response representing the set of strategies used to execute the first programming code.

18. The non-transitory machine-readable medium of claim 17, wherein the operations further comprise providing the response to the user device.

19. The non-transitory machine-readable medium of claim 15, wherein the set of strategies comprises an execution strategy that specifies a hierarchical order for executing a plurality of data queries associated with the first programming code.

20. The non-transitory machine-readable medium of claim 15, wherein the set of strategies comprises a processing strategy that specifies additional processing to be performed when executing a particular data query associated with the first programming code.

* * * * *